United States Patent
Bertucelli et al.

(10) Patent No.: US 9,987,775 B2
(45) Date of Patent: Jun. 5, 2018

(54) PRODUCTION OF POLYISOCYANURATE FOAM PANELS

(71) Applicant: Dow Global Technologies LLC, Midland, MI (US)

(72) Inventors: Luigi Bertucelli, Reggio Emilia (IT); Giuseppe Fantera, Modena (IT); Paolo Golini, Reggio Emilia (IT)

(73) Assignee: Dow Global Technologies LLC

( * ) Notice: Subject to any disclaimer, the term of this patent is extended or adjusted under 35 U.S.C. 154(b) by 0 days. days.

(21) Appl. No.: 15/191,675

(22) Filed: Jun. 24, 2016

(65) Prior Publication Data

US 2016/0303778 A1    Oct. 20, 2016

Related U.S. Application Data

(63) Continuation of application No. 14/396,531, filed as application No. PCT/EP2013/060465 on May 22, 2013, now abandoned.

(30) Foreign Application Priority Data

May 25, 2012 (EP) ..................... 12425099

(51) Int. Cl.
| | |
|---|---|
| *B29C 35/08* | (2006.01) |
| *B29C 44/34* | (2006.01) |
| *C08G 18/22* | (2006.01) |
| *C08G 18/40* | (2006.01) |
| *C08G 18/42* | (2006.01) |
| *B29C 44/12* | (2006.01) |
| *B29C 44/42* | (2006.01) |
| *C08J 9/00* | (2006.01) |
| *C08J 9/08* | (2006.01) |
| *C08J 9/14* | (2006.01) |
| *C08G 18/08* | (2006.01) |
| *C08G 18/76* | (2006.01) |
| *C08J 9/12* | (2006.01) |
| C08G 101/00 | (2006.01) |
| B29K 75/00 | (2006.01) |
| B29K 105/00 | (2006.01) |
| B29K 105/04 | (2006.01) |
| B29L 9/00 | (2006.01) |

(52) U.S. Cl.
CPC ...... *B29C 44/3403* (2013.01); *B29C 44/1233* (2013.01); *B29C 44/3415* (2013.01); *B29C 44/42* (2013.01); *C08G 18/0838* (2013.01); *C08G 18/14* (2013.01); *C08G 18/225* (2013.01); *C08G 18/4018* (2013.01); *C08G 18/4027* (2013.01); *C08G 18/4252* (2013.01); *C08G 18/7664* (2013.01); *C08J 9/0004* (2013.01); *C08J 9/0038* (2013.01); *C08J 9/08* (2013.01); *C08J 9/125* (2013.01); *C08J 9/141* (2013.01); B29K 2075/00 (2013.01); B29K 2105/0026 (2013.01); B29K 2105/04 (2013.01); B29L 2009/00 (2013.01); C08G 2101/0025 (2013.01); C08G 2105/02 (2013.01); C08J 2203/02 (2013.01); C08J 2203/10 (2013.01); C08J 2203/12 (2013.01); C08J 2203/14 (2013.01); C08J 2203/204 (2013.01); C08J 2375/06 (2013.01); C08J 2375/08 (2013.01); Y10T 428/249953 (2015.04)

(58) Field of Classification Search
CPC ...... C08J 2201/022; C08J 9/0004; C08J 9/06; B29C 44/1233; B29C 44/025
See application file for complete search history.

(56) References Cited

U.S. PATENT DOCUMENTS

| | | |
|---|---|---|
| 7,943,679 B2 | 5/2011 | De Vos et al. |
| 8,912,245 B2 | 12/2014 | Lista |
| 2006/0052467 A1 | 3/2006 | Pignagnoli et al. |
| 2011/0196055 A1 | 8/2011 | Kramer et al. |

FOREIGN PATENT DOCUMENTS

| | | |
|---|---|---|
| EP | 0854025 A1 | 7/1998 |
| EP | 1435366 A1 | 7/2004 |
| WO | 201004636 A1 | 1/2010 |
| WO | 2010015642 A1 | 2/2010 |
| WO | 2010046361 A1 | 4/2010 |
| WO | 2010/114695 A1 | 10/2010 |

OTHER PUBLICATIONS

PCT/EP2013/060465, International Search Report and Written Opinion of the International Searching Authority, dated Jun. 27, 2013, pp. 1-10.
PCT/EP2013/060465, International Preliminary Report on Patentability, dated Nov. 25, 2014, pp. 1-7.

*Primary Examiner* — Stella K Yi

(57) ABSTRACT

The present invention discloses the production of panels by a discontinuous process. The panels are produced by injecting a polyisocyanurate foam forming composition into the mold cavity at reduced pressure. The combination of certain polyisocyanurate foam forming formulation and the reduced pressure in the mold cavity allows production of and resulting sandwich panels in a discontinuous process where the produced panels are characterized by improved fire resistance.

15 Claims, No Drawings

PRODUCTION OF POLYISOCYANURATE FOAM PANELS

Polyisocyanurate foams are in general prepared by reacting a stoichiometric excess of polyisocyanate with a polyol or polyol mixture in the presence of a catalyst, a blowing agent, and generally other optional additives such as surfactants and the like. Polyisocyanurate foams are usually made at an isocyanate index of between 150 and 500; the term isocyanate index as used herein is the excess of isocyanate over the theoretical amount for (1:1) reaction with all active H expressed in percentage terms (i.e. 1:1=100).

Polyisocyanurate (PIR) foams, especially those with a high index (i.e., an index above 250, more preferably above 300), exhibit improved thermal stability and fire retardant properties over polyurethane foams. Their better fire retardant properties are due to the presence of isocyanurate rings, formed by the cyclotrimerisation reaction of isocyanates. The higher the isocyanate excess (expressed as isocyanate index), for a given polyol formulation, the higher the relative concentration of isocyanurate rings to urethane and/or urea bonds in the polymeric foam backbone, the better the fire retardant performance will be. This is the practical outcome of the higher bond energy associated to quasi-aromatic isocyanurate trimer structure vs. urethane bonds.

Such polyisocyanurate foams therefore, are widely used as insulating materials in the manufacture of sandwich panels used in the construction industry. Typically these foams are closed-cell, rigid low density foams containing a low-conductivity gas, such as a hydrofluorocarbon (HFC) or hydrocarbon, in the cells.

Sandwich panels with a PIR-foam core are today most commonly produced with a continuous process. The fabrication features of the continuous lamination process, including distribution of the reaction mix across the width of the panel, fast reactivity, etc. allow great latitude in PIR foam chemistry, including use of high index formulations and/or high content of highly viscous aromatic polyols. Such versatility in chemistry in turn allows one to attain excellent foam fire retardant behaviour, even in the case of using hydrocarbon blowing agent and halogen-free flame retardants.

For certain application, use of a discontinuous process is desirable as it allows more versatility in the design of the edges along the perimeter such as in the production of walk-in coolers with foamed-in-place locking device and sealing tapes. Such panels permit easy on-site assembly. Such sandwich panels are conventionally provided by arranging two spaced apart exterior shells (of iron sheet or other suitable material) between the planes of a press, or jig, inside a peripheral frame for retaining the foam as well the locking device and sealing tapes, and successively feeding a polyisocyanurate reaction mixture with a blowing agent, such as a pentane, into the defined foaming cavity of the panel. However, use of PIR foam chemistry in a discontinuous closed mold injection process is difficult due to poor flow (high applied densities), poor bonding strength, etc. Efforts have been carried out to improve some characteristics, e.g. tensile bond strength, by use of aliphatic polyesters as disclosed in WO 2010/114695A1, often at expense of other characteristics, e.g. poorer fire retardant properties.

Due to the poor ability of high index polyisocyanurate formulations, in particular when containing high levels of viscous aromatic polyesters, to flow and fill the foam cavity of a discontinuous panels, such panels, in general, require a certain extra-charge of the polyisocyanurate reactive mixture (overpacking) in order to obtain a complete filling up of the foaming cavity, and a suitable distribution of materials to give foam with acceptable mechanical and thermal properties. In addition, at the end of the expansion phase of the foam, the panel is to be maintained between the planes of the press or jig for a long period of time to oppose the thrust exerted by the polyisocyanurate material during foaming, as removal of the panel too early can cause an unacceptable post-expansion and bulging of the polyisocyanurate foam core.

It is now known that reducing the pressure of the mold cavity below atmospheric pressure has a positive effect on the filling process. For example, WO 2007/058793 and EP 0854025 both demonstrate the production of an improved polyurethane foam using vacuum/sub-atmospheric pressure injection technology. The process allows for homogeneous filling of the mold cavity, therefore avoiding voids, and also allows the polyurethane mixture to be injected in a lower quantity than in the absence of reduced pressure. The review "*Sandwich Panels: Innovative Solutions using Vacuum-assisted Foam Injection*" by Taverna et al (Cannon at UTECH 2000), states that vacuum/sub-atmospheric pressure injection technology is also useful in the production of polyisocyanurate sandwich panels.

However, there is still a need for an improved method to produce sandwich panels using a discontinuous process, having foam performance attributes similar to the ones currently attainable with the continuous process; in particular, sandwich panels having improved flame retardant properties while still maintaining good bonding to facers.

The objectives of the present invention are achieved by incorporating a proper amount of aromatic polyester polyol in a polyol formulation, including a flame retardant and injecting the polyol formulations, an isocyanate and blowing agent into a closed panel mold under reduced atmospheric pressure. The edges of the mold are constructed such that the finished panel has edges along the perimeter to allow for easy assembly.

In a first aspect, the present invention provides a method of making a polyisocyanurate foam comprising:
A) injecting into a closed mold cavity, wherein said mold cavity is under an absolute pressure of from 300 to 950 mbar, a reaction mixture comprising:
 a) an organic polyisocyanate;
 b) a polyol mixture, wherein the polyol mixture comprises an aromatic polyester polyol, wherein the aromatic polyester polyol is at least 35 weight percent of the total amount of polyol;
 c) a trimerisation catalyst;
 d) at least one flame retardant;
 e) optionally auxiliary substances; and
 f) a blowing agent component,
wherein said reaction mixture has an isocyanate index of greater than 250; and
B) curing to form a polyisocyanurate foam.

In a second aspect, the present invention provides a method of making a structural or self-supporting sandwich panel having two exterior shells and an intermediate polyisocyanurate foam core bonded to the said shells, comprising:
A) injecting into a closed mold cavity, wherein said mold cavity is under an absolute pressure of from 300 to 950 mbar, a reaction mixture comprising:
 a) an organic polyisocyanate;
 b) a polyol mixture, wherein the polyol mixture comprises an aromatic polyester polyol, wherein the aromatic polyester polyol is at least 35 weight percent of the total amount of polyol;
 c) a trimerisation catalyst;
 d) at least one flame retardant;

e) optionally auxiliary substances; and
f) a blowing agent component, wherein said closed mold cavity is defined by the two exterior shells and an annular frame, wherein said reaction mixture has an isocyanate index of greater than 250; and B) curing to form a polyisocyanurate foam bonded to the exterior shells.

The present invention is also a polyisocyanurate foam produced according to the method of the first aspect, wherein the PIR foam core is produced from a reaction mixture comprising:
a) an organic polyisocyanate;
b) a polyol mixture, wherein the polyol mixture comprises greater than 35% by weight aromatic polyester polyol and from 10 to 65% by weight novolac initiated polyol based on the total weight of polyol;
c) at least one curing and/or blowing catalyst;
d) at least one trimerisation catalyst;
e) at least one flame retardant;
f) optionally at least one silicone surfactant;
g) at least one chemical blowing agent selected from water and formic acid; and
h) pentane, wherein the reaction mixture has an isocyanate index of greater than 250.

The present invention is also a sandwich panel produced according to the method of the second aspect comprising two exterior shells and an intermediate polyisocyanurate structural foam core, wherein the PIR foam core is produced from a reaction mixture comprising:
a) an organic polyisocyanate;
b) a polyol mixture, wherein the polyol mixture comprises greater than 35% by weight aromatic polyester polyol and from 10 to 65% by weight novolac initiated polyol based on the total weight of polyol;
c) at least one curing and/or blowing catalyst;
d) at least one trimerisation catalyst;
e) at least one flame retardant;
f) optionally at least one silicone surfactant;
g) at least one chemical blowing agent selected from water and formic acid; and
h) pentane, wherein the reaction mixture has an isocyanate index of greater than 250.

In a further embodiment, the flame retardant in the above noted embodiments is a halogen free flame retardant.

Various terms used in the text of the present invention have the following meaning:

Polyol Mixture: The polyol mixture is a blend of polyols used in production of the PIR foam.

Polyol Formulation: The polyol mixture in combination with any additives, such as catalysts, flame retardants, surfactants and chemical blowing agents, but excluding physical blowing agent.

Pressure: The reduced pressure within the mold as used herein refers to absolute pressure with the unit mbar (or hPa). The reference pressure is 1000 mbar=1000 hPa=approx 1 atmosphere at sea level=0 bar gauge. While reference is made to atmospheric pressure at sea level, it should be understood the gauge pressure will be at least 50 mbar lower than the measured atmospheric pressure. To further illustrate, an absolute pressure of 800 to 950 mbar at sea level, approximates a gauge pressure of −50 to −200 mbar.

The low internal pressure maintained within the polymerization cavity helps the polyisocyanurate reactive mixture to more evenly fill the available space, and therefore reduces the required overpacking and resulting extra pressure on the press planes. In the present invention, more viscous components either due to the type of polyols or isocyanates and/or faster reactive systems can be processed. The present invention may also allow for a reduction in the absolute level of physical blowing agent which may reduce the polyisocyanurate formulation costs, in particular when using newly developed blowing agents such as hydro-fluoroolefins, and volatile organic compound emissions upon disposal of an article containing such a foam.

The composition contains various components which are described in more detail below.

All features described in connection with any aspect of the invention can be used with any other aspect of the invention.

Suitable polyisocyanates used in the present invention are aliphatic, cycloaliphatic, arylaliphatic, aromatic polyisocyanates and derivatives thereof. Such derivatives include allophanate, biuret and NCO terminated prepolymer. Aromatic isocyanates, especially aromatic polyisocyanates are preferred. It is preferred to use aromatic diisocyanates such as isomers of toluene diisocyanate (TDI), crude TDI, isomers of diphenyl methane diisocyanate, and higher functional polymethylene polyphenyl polyisocyanates (pMDI).

Mixtures of isocyanates and crude polyisocyanates as well as MDI and TDI prepolymers, blends thereof with polymeric and monomeric MDI may also be used in the practice of this invention. The total amount of polyisocyanate used to prepare the foam in the present inventions should be sufficient to provide an isocyanate reaction index of from 250 to 500. Preferably the index is from 300 to 450. More preferably the index is from 300 to 400. An isocyanate reaction index of 100 corresponds to one isocyanate group per isocyanate reactive hydrogen atom present, such as from water and the polyol mixture.

In certain embodiments the polyisocyanates are polymeric MDI products, which are a mixture of polymethylene polyphenylene polyisocyanates in monomeric MDI, having an average isocyanate functionality of from 2.5 to 3.3 isocyanate groups/molecule and an isocyanate equivalent weight of from 130 to 170. Suitable commercially available products of that type include PAPI™ 27, Voranate™ M229, Voranate™ 220, Voranate™ M595 and Voranate™ M600, Voranate M647 all available from The Dow Chemical Company.

In the present invention, isocyanates having viscosities up to 2,000 cps, measured at 25° C. may be preferably used.

The polyol mixture of the present invention comprises an aromatic polyester polyol. The aromatic polyester polyol is based on inter-esterification product of at least one aromatic component and at least one polyhydroxy component.

As used herein, "aromatic" refers to organic compounds having at least one conjugated ring of alternate single and double bonds, which imparts an overall stability to the compounds. The term "polyester polyol" as used herein includes any minor amounts of unreacted compound, for example, polyhydroxy compound remaining after the preparation of the polyester polyol. Preferably the aromatic component is based on a phthalic acid based material such as phthalic anhydride, phthalic acid, isophthalic acid, terephthalic acid, methyl esters of phthalic, isophthalic, or terephthalic acid, dimethyl terephthalate, trimellitic anhydride, pyromellitic dianhydride, or mixtures thereof. While the aromatic polyester polyol may be prepared from substantially pure reactant materials, more complex starting materials, such as polyethylene terephthalate, may be advantageous. Other residues are dimethyl terephthalate (DMT) process residues, which are waste or scrap residues from the manufacture of DMT.

Suitable polyhydroxy components are those having a molecular weight of from 60 to 1000. In a further embodiment the molecular weight is less than 800, less than 600 or even less than 500. In a further embodiment the molecular weight is less than 400. Examples of suitable polyhydroxy compounds, such as glycols, include ethylene glycol, propylene glycol, diethylene glycol (DEG), dipropylene glycol, triethylene glycol; polyethylene glycol (PEG) and polypropylene glycol.

Generally, the aromatic component comprises at least 20, 23, 25 or at least 28 weight percent of the final polyester polyol. In a further embodiment, the aromatic component comprises less than 50, 45, 40 or less than 35 weight percent of the polyester polyol. The remaining weight percent of the polyester polyols is comprised of the polyhydroxy component.

In one embodiment, the polyester polyol is based on terephthalic acid, DEG and PEG as disclosed in publication WO2010/015642.

The polyester polyols are formed by the polycondensation/transesterification and polymerization of the aromatic and polyhydroxy component under conditions well known in the art. See for Example G. Oertel, Polyurethane Handbook, Carl Hanser Verlag, Munich, Germany 1985, pp 54-62 and Mihail Ionescu, Chemistry and Technology of Polyols for Polyurethanes, Rapra Technology, 2005, pp 263-294. In general, the reaction is done at temperature of 180 to 280° C. In another embodiment the reaction is done at a temperature of at least 200° C. In a further embodiment the reaction is done at a temperature of 215° C. or greater. In a further embodiment the transesterification is done at a temperature of 260° C. or less.

While the reaction may take place under reduced or increased pressure, the reaction is generally carried out near atmospheric pressure conditions.

The aromatic and polyhydroxy compounds are generally reacted in a ratio to give an aromatic polyester polyol with a hydroxyl number from 150 $mg_{KOH}/g$ to 400 $mg_{KOH}/g$, preferably from 175 $mg_{KOH}/g$ to 300 $mg_{KOH}/g$ and in a further embodiment from 200 $mg_{KOH}/g$ to 250 $mg_{KOH}/g$.

The aromatic polyester polyol is preferably used in an amount of at least 35 weight percent of the total amount of polyol mixture, preferably the aromatic polyester polyol is at least 40 weight percent of the total amount of polyol, more preferably the aromatic polyester polyol is at least 50 weight percent of the total amount of polyol. In some embodiments the aromatic polyester polyol is at least 60 weight percent of the total amount of polyol. The aromatic polyester polyol is preferably less than 90 weight percent of the total amount of polyol; preferably the aromatic polyester polyol is less than 80 weight percent of the total amount of polyol.

In a particular embodiment of the present invention a Novolac-type polyether polyol is used in the polyol mixture in addition to the polyester polyol.

Novolac-type polyether polyols are the alkoxylation products of a phenol-formaldehyde resin. Novolac-resins are prepared by condensing phenol with formaldehyde in the presence of an acid catalyst. Methods for the production of novolac polyols are known in the art, as described, for example, in U.S. Pat. Nos. 2,838,473; 2,938,884; 3,470,118; 3,686,101; and 4,046,721.

In general, suitable acidic catalysts for the novolac resin reaction include oxalic acid, zinc acetate, hydrochloric acid, glacial acetic acid, hydrochloric, sulphuric acid or a combination thereof. The condensation reaction is generally done at a reaction temperature of between 60 and 160° C.

Phenols which may be used to prepare the Novolac initiator include: o-, m-, or p-cresols, ethylphenol, cardanol (including that obtained from cashew nuts), nonylphenol, p-phenylphenol, 2,2-bis(4-hydroxyphenol)propane, beta-naphthol, beta-hydroxyanthracene, p-chlorophenol, o-bromophenol, 2,6-dichloro-phenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl)phenol, 2-(4-hydroxyphenol)ethanol, 2-carbethoxyphenol, 4-chloro-methylphenol, and mixtures thereof. It is especially preferred that the phenols used to prepare the Novolac-type polyether polyols be unsubstituted.

While formaldehyde or a derivative thereof, such as trioxane, is generally used as the aldehydic reactant, acetaldehyde, propionaldehyde or butyraldehyde may also be used.

Typically, Novolac starting materials are prepared by reacting a phenol (for example, a cresol) with from about 0.8 to about 1.0 moles of formaldehyde per mole of the phenol in the presence of an acidic catalyst to form a polynuclear condensation product containing from 2.1 to 12, preferably from 2.2 to 6, and more preferably from 2.5 to 5 phenol units per molecule.

The Novolac resin is then reacted with an alkylene oxide such as ethylene oxide, propylene oxide, butylene oxide, or isobutylene oxide to build molecular weight to a desired level. Generally the final polyol will desirably have a molecular weight from about 300 to about 1500, and in certain non-limiting embodiments, from about 400 to about 1000. Preferred Novolac polyols are those having an average of from 3 to 6 hydroxyl moieties per molecule and an average hydroxyl number of from about 100 to about 500 $mg_{KOH}/g$, preferably from about 100 to about 300 $mg_{KOH}/g$.

The Novolac polyol is preferably used in an amount of at least 10 weight percent of the total amount of polyol mixture, preferably the Novolac polyol is at least 15 weight percent of the total amount of polyol, more preferably the Novolac polyol is at least 20 weight percent of the total amount of polyol, more preferably the Novolac polyol is at least 30 weight percent of the total amount of polyol mixture. The Novolac polyol is preferably less than 65 weight percent of the total amount of polyol, preferably the Novolac polyol is less than 60 weight percent of the total amount of polyol, and in a further embodiment, less than 50 weight percent of the polyol mixture.

The polyol mixture of the present invention may also comprise one or more other polyols other than the above desired aromatic polyester and Novolac polyols. Examples of additional polyols include polyether polyols and aliphatic polyesters.

Additional polyether polyols may be a polyoxypropylene, a polyoxyethylene or combination thereof, either as a block copolymer or a random copolymer. Initiators for such polyols include, for example, polyhydric alcohols, such as, glycerol, pentaerythritol, ethanediol, 1,2- and 1,3-propanediol, diethylene glycol, dipropylene glycol, 1,4-butane-diol, 1,6-hexanediol, trimethylolpropane, for example, and sugars, such as sorbitol, sucrose, glucose, fructose or other sugars Polyols may also be formed from mixtures of initiators such as a high functionality starter (sorbitol/sucrose) and a lower functionality starter such as glycerin to give co-initiated polyols having functionality of from 3 to 5 and preferably a hydroxyl value from 300 to 550 $mg_{KOH}/g$. Other polyols may be selected from both aliphatic and aromatic amine-containing compounds. Examples of such initiator molecules include aliphatic and aromatic, unsubstituted or N-mono-, N,N- and N,N'-dialkyl-substituted diamines having from 1 to 4 carbon atoms Examples alkyl amine initiators include unsubstituted or mono- or dialkyl-substituted ethylenediamine, diethylenetriamine, triethylenetetramine, 1,3-propylene-diamine, 1,3- and 1,4-butyl-enediamine, 1,2-, 1,3-, 1,4-, 1,5- and 1,6-hexamethylene-diamine, Examples of initiators containing an aromatic amine include, aniline, phenylene-diamines, 2,3-, 2,4-, 3,4- and 2,6-tolylenediamine, and 4,4'-, 2,4'- and 2,2'-diamino-diphenylmethane.

Other suitable initiator molecules are alkanolamines, for example, ethanolamine, N-methyl- and N-ethylethanolamine; dialkanolamines, for example, diethanolamine, N-methyl- and N-ethyldi-ethanolamine, and trialkanolamines, for example, triethanolamine.

Another class of aromatic based polyether polyols which may be used are an alkylene oxide adduct of phenol/formaldehyde/alkanolamine resin, frequently called a "Mannich" polyol such as disclosed in U.S. Pat. Nos. 4,883,826; 4,939,182; and 5,120,815.

An example of a phenol based polyol which can be used is the alkoxylation product of bisphenol A. Bisphenol A is produced by the condensation product of acetone with two phenols.

If present, the polyether polyol, excluding the Novolac-initiated polyol, is used in an amount of at least 2 weight percent of the total of polyol mixture. The polyether polyol may be present in at least 5 weight percent of the total amount of polyol, 10 weight percent of the total amount of polyol, or 20 weight percent of the total amount of polyol. The polyether polyol is preferably less than 55 weight percent of the total amount of polyol; preferably the polyether polyol is less than 50 weight percent of the total amount of polyol, more preferably the polyether polyol is less than 45 weight percent of the total amount of polyol.

When used the polyether polyol has a hydroxyl number from 20 $mg_{KOH}/g$ to 700 $mg_{KOH}/g$, more preferably from 25 $mg_{KOH}/g$ to 700 $mg_{KOH}/g$.

The polyol mixture of the present invention may also comprise one or more aliphatic polyester polyols.

Illustrative aliphatic polyester polyols may be prepared from organic dicarboxylic acids having from 2 to 12 carbon atoms and polyhydric alcohols, preferably diols, having from 2 to 12, preferably from 2 to 8 and more preferably 2 to 6 carbon atoms. Examples of dicarboxylic acids are succinic acid, glutaric acid, adipic acid, suberic acid, azelaic acid, sebacic acid, decanedicarboxylic acid, malonic acid, pimelic acid, 2-methyl-1,6-hexanoic acid, dodecanedioic acid, maleic acid and fumaric acid. Such acids may be used individually or as mixtures. Examples of dihydric and polyhydric alcohols include ethanediol, diethylene glycol, Methylene glycol, 1,2- and 1,3-propanediol, dipropylene glycol, 1,4-butanediol and other butanediols, 1,5-pentanediol and other pentanediols, 1,6-hexanediol, 1,10-decanediol, glycerol, and trimethylolpropane. Illustrative of the polyester polyols are poly(hexanediol adipate), poly(butylene glycol adipate), poly(ethylene glycol adipate), poly(diethylene glycol adipate), poly(hexanediol oxalate), poly(ethylene glycol sebecate), and the like.

If present, the polyester polyol is preferably at least 1 weight percent of the total amount of polyol, preferably the polyester polyol is at least 2 weight percent of the total amount of polyol, more preferably the polyester polyol is at least 5 weight percent of the total amount of polyol. The polyester polyol is preferably less than 55 weight percent of the total amount of polyol; preferably the polyester polyol is less than 50 weight percent of the total amount of polyol, more preferably the polyester polyol is less than 45 weight percent of the total amount of polyol.

The polyol mixture will generally have a hydroxyl number of from 100 $mg_{KOH}/g$ to 400 $mg_{KOH}/g$. Preferably the hydroxyl number is from 150 $mg_{KOH}/g$ to 350 $mg_{KOH}/g$ and more preferably from 200 $mg_{KOH}/g$ to 30 $mg_{KOH}/g$.

The polyol mixture forms the bulk of the polyol formulation. It is preferred that the polyol mixture comprises from 30 to 95 weight percent of the polyol formulation, preferably from 40 to 85 weight percent and more preferably from 45 to 80 weight percent.

The balance of the polyol formulation is made up of catalysts, cross-linkers, chain extenders, surfactants, fillers, flame retardants, chemical blowing agents and other additives.

In a preferred embodiment of the present invention, there is provided one or more catalysts.

Polyisocyanurate catalysts provide three main purposes, namely to act as curing catalysts, blowing catalysts and trimerisation catalysts. The present invention employs at least a trimerisation catalyst. It is preferred that the catalytic package of the present invention provides at least at least one additional curing or blowing catalyst. It is further preferred that all three catalyst types are present. The inclusion of a trimer catalyst is intended to allow isocyanurate ring formation, essential for the reaction to fire property, while the use of the other mentioned catalyst types must be fine-tuned in order to get the desired reaction profile and optimized processability performance, providing gel time as reactivity parameter longer than 50 seconds, measured on foam injected by means of high pressure foaming machine at typical environment temperature (20-25° C.).

Trimerisation catalysts are able to promote the reaction of isocyanate on itself. Examples of trimerisation catalysts include tris(dialkylaminoalkyl)-s-hexahydrotriazines such as 1,3,5-tris(N,N-dimethylaminopropyl)-s-hexahydrotriazine; potassium acetate, potassium ethyl hexanoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, in some embodiments, pendant hydroxyl groups. Examples of Commercially available trimerisation catalysts include DABCO™ TMR-30; DABCO™ K-2097, POLYCAT™ 41, POLYCAT™ 43, POLYCAT™ 46, DABCO™ TMR, CURITHANE™ 52, DABCO K15.

The trimerisation catalyst is preferably at least 0.3 weight percent of the total amount of polyol formulation, preferably at least 0.6 weight percent of the total amount of polyol formulation, and more preferably at least 0.7 weight percent of the total amount of polyol formulation. In addition, the trimerisation catalyst is less than 5 weight percent of the total amount of polyol formulation, preferably less than 4 weight percent of the total amount of polyol formulation, and more preferably less than 3 weight percent of the total amount of polyol formulation.

Some of these catalysts are solids or crystals and can be dissolved in the proper solvent which can be the polyol, water, dipropylene glycol or any other carrier compatible with the polyisocyanurate foaming composition.

While it is known that some catalysts may promote both blowing and curing (so-called "balanced" catalysts), such are conventionally differentiated by their tendency to favour blow reaction (urea or water and isocyanate reaction), in the case of the blowing catalyst, or the curing reaction (urethane or polyol and isocyanate reaction), in the case of the curing catalyst. In some non-limiting embodiments, a catalyst that technically may catalyze both blowing and curing may be selected for its favoured tendency, e.g., curing, and combine with another catalyst directed more toward the other purpose, e.g., blowing, and vice versa.

Examples of suitable blowing catalysts that may tend to favour the urea reaction are short chain tertiary amines or tertiary amines containing at least an oxygen and may include bis-(2-dimethylaminoethyl)ether; pentamethyldiethylene-triamine, triethylamine, tributyl amine, N,N-dimethylaminopropylamine, dimethylethanolamine, or N,N,N',N'-tetra-methylethylenediamine. In one embodiment, a combination of bis(dimethylaminoethyl)ether and dipropylene glycol may be an effective blowing catalyst, for example, in a 70/30 weight percent ratio. Combinations of any of the above may also be selected.

The amount of blowing catalyst is added to give a gel time of at least 50 seconds. The adjustment of the catalyst levels to obtain the desired gel time is known to those skilled in the art. In general the blowing catalysts is at least 0.1 weight percent of the total amount of polyol formulation, preferably at least 0.15 weight percent, and more preferably at least 0.2 weight percent of the total amount of polyol formulation. In addition, the blowing catalyst is preferably less than 0.4 weight percent of the total amount of polyol formulation.

Examples of suitable curing catalysts that may tend to favour the urethane reaction include, generally, amidines, tertiary amines, organometallic compounds, and combinations thereof. These may include, but are not limited to, amidines such as 1,8-diazabicyclo[5.4.0]undec-7-ene and 2,3-dimethyl-3,4,5,6-tetrahydropyrimidine, and their salts.

Organometallic compounds may include organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate. Bismuth salts of organic carboxylic acids may also be selected, such as, for example, bismuth octanoate. The organometallic compounds may be selected for use alone or in combinations, or, in some embodiments, in combination with one or more of the highly basic amines listed hereinabove.

If present, the curing catalysts are generally at least 0.05 weight percent of the total amount of polyol formulation, preferably at least 0.1 weight percent of the total amount of polyol formulation. In addition, the curing catalysts is generally less than 0.4, preferably less than 0.3 weight percent of the total amount of polyol formulation.

Example of catalysts able to promote both blowing and curing reactions are tertiary amines such as triethylamine, tributylamine, dimethylbenzylamine, N-methyl-, N-ethyl-, and N-cyclohexylmorpholine, N,N,N',N'-tetra-methylethylenediamine, N,N,N',N'-tetramethylbutanediamine and -hexanediamine-tetramethyldiaminoethyl ether, bis(dimethylamino-propyl)urea, dimethylpiperazine, dimethylcyclohexylamine, 1,2-dimethyl-imidazole, 1-aza-bicyclo[3.3.0]octane, triethylenediamine (TEDA).

Another class of catalysts for both blowing and curing reactions are alkanolamine compounds, such as triethanolamine, triisopropanolamine, N-methyl- and N-ethyldiethanolamine, and dimethylethanolamine may also be selected. Combinations of any of the above may also be effectively employed.

Examples of commercially available blowing, curing or blowing/curing catalyst include NIAX A-4, NIAX A6, POLYCAT 6, POLYCAT 5, POLYCAT 8, Niax A1; POLYCAT 58, DABCO T, DABCO NE 300, TOYOCAT RX 20, DABCO DMDEE, JEFFCAT ZR 70, DABCO™ 33 LV, NIAX A-33, DABCO R-8020, NIAX TMBDA, POLYCAT 77, POLYCAT 6, POLYCAT 9, POLYCAT 15, JEFFCAT ZR 50, TOYOCAT NP, TOYOCAT F94, DABCO NEM, etc. POLYCAT and DABCO catalysts are available from Air Products; TOYOCAT catalysts are available from Tosho Corporation; NIAX Catalysts are available from Momentive Performance Material; and JEFFCAT catalysts are available from Huntsman.

Some of these catalysts being solids or crystals are dissolved in the proper solvent which can be polyol, water, blowing agent, DPG or any carrier compatible with the polyisocyanurate foam forming components.

In one particular embodiment of the present invention, the combined amount of catalysts, not considering the solvents, is from 0.6 to 5 weight percent, preferably from 0.7 to 4 weight percent, more preferably from 0.8 to 3 weight percent, based on the weight of the polyol formulation.

As known to those skilled in the art, the amount of catalyst can vary based on the temperatures of the materials.

According to the method of the present invention, one or more flame retardants are present.

Flame retardants are chemical additives used across a variety of consumer products, such as plastics, textiles, leather, paper, rubber, etc, to inhibit or resist the spread of fire. The flame retardants interfere with a particular stage of combustion, i.e., during heating, decomposition, ignition or flame spread, through physical or chemical actions.

Chemicals which may be used as flame retardants can be mineral, halogen containing, nitrogen containing and phosphorus containing chemicals, silicon based chemicals, etc. The term "retardant" represents a class of use and not a class of chemical structure.

In recent years, there have been growing concerns about the safety of halogenated flame retardant chemicals, and the impact they have on the environment. There is a high demand therefore, for polyisocyanate foam sandwich panels that use non-halogenated flame retardant materials. Initiatives, such as The U.S. Green Building Council (US GBC) Leadership in Energy and Environmental Design (LEED) certification scheme, are in place in the U.S. to promote buildings that are environmentally responsible, profitable and healthy places to live and work. The LEED Green Building Rating System is a voluntary standard that recognizes the life cycle assessment (LCA) and life cycle costing (LCC) of building construction. The selection of building insulation products may contribute to LEED credits in several categories such as energy performance and indoor air quality.

In one embodiment of the present invention therefore, there is provided a method of making a polyisocyanurate foam comprising only halogen-free flame retardants.

Examples of suitable halogen free flame retardants include metal hydroxides such as aluminium and magnesium hydroxide, phosphorus based flame retardants including organic and inorganic phosphates, phosphonates, phosphites, phosphinates, etc. and nitrogen based flame retardants such as melamine and melamine derivatives (e.g., melamine cyanurate, melamine polyphosphate, melem, melon). Examples of suitable phosphorous-containing organic compounds are described in EP 1023367 B1, paragraphs [0026] to [0032], the referenced paragraphs included herein by reference.

Preferably the halogen-free flame retardant is an organic phosphate such as triethyl phosphate (TEP).

Preferably, the halogen-free flame retardant is an organic phosphonate such as diethyl ethyl phosphonate (DEEP).

In general, the halogen-free flame retardants are added at a level of from 5 to 50 parts by weight, preferably from 10 to 40 parts by weight, more preferably from 15 to 30 parts by weight of the flame retardant per 100 parts per weight of the polyol formulation.

Since certain types of halogenated flame retardants are still considered useful however, the present invention also provides a method of making polyisocyanurate foams using at least one halogenated flame retardant.

Generally such flame retardants are halogenated aromatic compounds, or halogen-substituted phosphates. Common halogen-substituted phosphates include tris(2-chloroethyl) phosphate, tris(1,3-dichloropropyl)phosphate, tris(2-chloropropyl) phosphate, tris(2,3-dibromopropyl) phosphate, chloropropyl bis(bromopropyl) phosphate and tetrakis(2-chloroethyl)ethylene diphosphate.

Halogenated polyols, which are reactive and permanently bonded in the polymer, may be used. Examples of commonly used halogenated polyols are PHT-4 diol and/or SAYTEX RB79.

In general, the halogenated flame retardants are added at a level of from 5 to 60 parts by weight, preferably from 5 to 50 parts by weight, more preferably from 10 to 40 parts by weight of the flame retardant per 100 parts per weight of the polyol formulation.

If desired, various additives can be incorporated into the reaction mixture for producing the foams of the present invention. Examples are chain extenders, crosslinking agents, surface-active substances, foam stabilizers, cell regulators, fillers, dyes, pigments, hydrolysis inhibitors, fungistatic and bacteriostatic substances.

In one preferred embodiment chain extenders and/or crosslinking agents are included to help adjusting the polymer crosslinking. Unlike the polyols, these are not polymers in their own right. Chain extenders are generally grouped as having a functionality equal to 2. They are usually represented by relatively short chain or low molecular weight molecules such as hydroquinone di(β-hydroxyethyl)ether, ethylene glycol (EG), diethylene glycol (DEG), triethylene glycol, tetraethylene glycol, propylene glycol, dipropylene glycol, tripropylene glycol, 1,3-propanediol, 1,3-butanediol, 1,4-butanediol (BDO), neopentyl glycol, 1,6-hexanediol, 1,4-cyclohexanedimethanol, methyldiethanolamine, phenyldiethanolamine, combinations thereof, and the like. Particularly frequently used are dipropylene glycol (DPG), 1,4-butanediol (BDO), diethylene glycol (DEG) and combinations thereof.

The crosslinking agents are generally grouped as having a functionality equal to 3 or more. They also are usually represented by relatively short chain or low molecular weight molecules such as glycerine, ethanolamine, diethanolamine, trimethylolpropane (TMP), 1,2,6-hexanetriol, triethanol-amine, pentaerythritol, N,N,N',N'-tetrakis(2-hydroxypropyl)-ethylenediamine, diethyl-toluenediamine, dimethylthiotoluenediamine, combinations thereof, and the like. Particularly frequently used are glycerine, 1,4-trimethylolpropane (TMP), and combinations thereof.

Those skilled in the art will be familiar with a wide range of suitable chain extenders and/or crosslinking agents. When used, the crosslinker and/or chain extender may be used in amount up to 8 wt % of the polyol formulation.

Suitable surface-active substances (surfactants and emulsifiers) are, for example, compounds which serve to aid the homogenization of the starting materials and may also be suitable for regulating the cell structure of the foam.

Surfactants, including silicone-based and organic ones, may be added to serve as cell stabilizers. Some representative materials are, generally, polysiloxane polyoxylalkylene block copolymers, such as those disclosed in U.S. Pat. Nos. 2,834,748; 2,917,480; and 2,846,458, the disclosures of which are incorporated herein by reference in their entireties. Also included are organic surfactants containing polyoxyethylene-polyoxybutylene block copolymers, as are described in U.S. Pat. No. 5,600,019, the disclosure of which is incorporated herein by reference in its entirety. Other surfactants include polyethylene glycol ethers of long-chain alcohols, tertiary amine or alkanolamine salts of long-chain allyl acid sulfate esters, alkylsulfonic esters, alkyl arylsulfonic acids, and combinations thereof.

Surfactants, such as NIAX™ L-6900 or DABCO™ DC5598, may be included in any amount ranging from 0 to 6 parts. (NIAX™ L-6900 is available from Momentive, DABCO™ DC5598 is available from Air Products).

Surface-active substances also comprise emulsifiers, such as the sodium salts of castor oil sulfates or of fatty acids and also amine salts of fatty acids, e.g., diethylamine oleate, diethanolamine stearate, diethanolamine ricinoleate, salts of sulfonic acids, e.g., alkali metal or ammonium salts of dodecylbenzene- or dinaphthylmethanedisulfonic acid and ricinoleic acid. Other foam emulsifiers include, for example, ethoxylated alkylphenols, ethoxylated fatty alcohols, paraffin oils, castor oil or ricinoleate esters.

The emulsifier substances are usually employed in amounts of from 0.01 to 5 parts by weight, preferably 1 to 5 parts per 100 parts of polyol formulation.

Agents, such as perfluoroalkanes are important additives in the field of rigid foams since they help regulate foam cell structure, hence they can be used with the present invention.

Examples of fillers include talcs, clays, silicas, calcium carbonates, graphites, glass, carbon black, glass fibers or other ceramics, or powdered polymers such as polyamide, propylene, ABS or recycled polyurethane foam. Fillers can be used in an amount of up to 20% by weight of the polyol formulation.

The method of the present invention is undertaken in the presence of a physical blowing agent. Suitable physical blowing agents for use in the present invention are those having a boiling point above freezing (0° C.). Preferably at least one blowing agent has a boiling point above 10° C. and more preferably 15° C. or higher.

The blowing agent composition includes at least one physical blowing agent which is a hydrocarbon, hydrofluorocarbon (HFC), fluorocarbon, dialkyl ether or a fluorine-substituted dialkyl ether, hydrochlorofluoroolefin (HCFO), hydrofluoroolefin (HFO) or a mixture of two or more thereof. Blowing agents of these types include, for example, propane, isopentane, n-pentane, n-butane, isobutane, isobutene, cyclopentane, dimethyl ether, 1,1,1,2-tetrafluoroethane (HFC-134a), 1,1,1,3,3-pentafluorobutane (HFC-365mfc), 1,1-difluoroethane (HFC-152a), 1,1,1,2,3,3,3-heptafluoropropane (HFC-227ea), and 1,1,1,3,3-pentafluoropropane (HFC-245fa). Examples of HFO and HCFO blowing agents include pentafluoropropenes, such as HFO-1225yez and HFO-1225ye; tetrafluoropropenes, such as HFO-1234yf (2,3,3,3-tetrafluoropropene) and HFO-1234ze (1,3,3,3-tetrafluoropropene); chlorofluoropropenes, such as, HCFO-1233zd (1,1,1-trifluoro-3-chloropropene), HCFO-1223 dichlorotrifluoropropene); HCFO-1233xf (2-chloro-3,3,3-trifluoropropene); and 1,1,1,4,4,4-hexafluoro-2-butene (FEA-1100). Such blowing agents are disclosed in numerous publications, for example, publications WO2008121785A1 WO2008121790A1; US 2008/0125506; US 2011/0031436; US2009/0099272; US2010/0105788 and US2011/0210289. Methyl formate and dimethyoxymethane are additional examples of physical blowing agent which may be utilized. The hydrocarbon and hydrofluorocarbon blowing agents are preferred. In a further embodiment the hydrocarbon blowing agent utilized is cyclopentane.

Due to the in-mold reduced pressure, blowing agents having a high boiling point, that is, above 50° C., such as cyclohexane or methyl-cyclohexane can be used in the present invention. Optionally products having a boiling point below 0° C., such as for instance isobutene, can be combined with the other blowing agents listed heretofore.

Other blowing agents which may be used in combination with these compounds are rare gases such as Argon, Krypton or Xenon.

All aforementioned physical blowing agents can be used as pure components as well as mixtures of these various physical blowing agents.

The method of the present invention also uses at least one chemical blowing agent, such as water or formic acid. The total amount of chemical blowing agent is present in a level of from 0.1 weight percent to 5 weight percent, based on the total weight of the polyol formulation. Preferably, the amount of chemical blowing agent is from 0.5 to 4 weight percent.

A chemical blowing agent content which is too high can lead to increased brittleness (due to increased content of polyurea linkages) and increase in thermal conductivity (due to the higher molar ratio of carbon dioxide to the physical blowing agent in the cell gas composition).

The polyisocyanurate foam of the present invention is made by mixing the polyol formulation and the isocyanate components at approximate 20° C. in the presence of the physical blowing agent and injecting into a closed mold cavity which has an internal air pressure below atmospheric pressure and under such conditions that the polyols and polyisocyanate(s) react and cure.

It is usually not necessary to pre-heat the components or apply heat to the reaction mixture in order to obtain a good reaction and cure but heating may be used if desired. However, the in-mold cavity is generally heated, preferably at 30 to 60° C., more preferably from 40 to 50° C., to provide suitable surface cure and efficient adhesion of the foam to the plastic and/or metal liner.

The mold has an internal pressure, according to this invention, which is sufficient to provide a good filling with the used foaming composition. The internal mold pressure can vary between 300 and 950 mbar, preferably between 400 and 950 mbar, and more preferably from 500 to 900 mbar. The internal air pressure is controlled in such that the moulded density can be obtained with the right balance of filling vs. gelling time.

Alternatively, applying a vacuum just after the injection of the foaming composition may be done, but this is not the preferred option. By injection under reduced in-mold pressure, or applying vacuum just after injection, allows the foaming composition to flow and fill the cavity quicker and more efficiently than with the conventional process at atmospheric pressure, hence more viscous, or more reactive, foam formulations can be used with the present invention. Techniques for applying a partial vacuum to a mold cavity are known in the art, see for example U.S. Pat. Nos. 5,454,582 and 5,972,260. Prior to injection under reduced pressure in the closed mold cavity, the cavity may be purged with an inert gas, such as nitrogen, for safety reasons when flammable blowing agents are used in the foam formulation.

The molded density of the foam is generally from 30 to 75 kg/m$^3$, preferably from 35 to 70 kg/m$^3$, more preferably from 35 to 65 kg/m$^3$. To obtain the foams within the desired density range under the partial vacuum employed and to assure the entire mold cavity is properly filled, the mold is generally filled to a packing factor of greater than 1.03 and is not higher than 1.9. Preferably the packing factor is set from 1.06 to 1.6 and more preferably from 1.1 to 1.5.

Advantageously, the polyisocyanurate foams prepared in the present invention may exhibit improved flame retardant behavior when compared with conventional foams produced at similar density using conventional formulations and conventional process done at atmospheric pressure.

As used herein, the term "improved flame retardant behavior" refers to the capability of the foam to have a flame height of not higher than 15 centimeters when tested according to EN ISO 11925/2. In certain embodiments the invention may be useful in satisfying reaction-to-fire requirements of building products based on new Euroclasses regulations (European Standard EN 13501).

The polyisocyanurate sandwich panels produced from the process of the present invention are preferably used in the assembly of structures for cold storage and transportation, such as walk in coolers, refrigerated trucks, refrigerated rail cars, etc.

The following examples are given to illustrate the invention and should not be interpreted as limiting in anyway.

Unless specific, values in the working examples are parts by weight. A description of the raw materials used in the examples is as follows:

Polyol 1 is an aromatic polyester polyol; hydroxyl number 215 based on 31.5% TPA (terephthalic acid) 8.5% DEG (diethylene glycol) and 60% PEG200 (polyethylene glycol, 200 MW).

Polyol 2 is an aromatic resin-initiated oxypropylene-oxyethylene polyether polyol; hydroxyl number approximately 200, average functionality of about 3.3; where the resin is a condensate of phenol and formaldehyde.

Polyol 3 is a sucrose/glycerine initiated polyether polyol, with a functionality of about 7, equivalent weight about 200, and hydroxyl number of 280, available from The Dow Chemical Company under the tradename VORANOL™ 280.

Polyol 4 is a glycerol-initiated polyoxyethylene/polyoxypropylene polyether polyol; hydroxyl number 32-35; 1,675 equivalent weight; available from The Dow Chemical Company as VORANOL™ CP-1421

Additive 1 Dimethyl adipate
Flame Retardant 1 (FR 1) Triethyl Phosphate (TEP)
Flame Retardant 2 (FR 2) Diethyl ethyl phosphonate (DEEP)
Flame Retardant 3 (FR 3) Tris(chloroisopropyl)phosphate (TCPP)
Surfactant DABCO™ DC-5598, silicone surfactant; available from Air Products Catalyst 1 Potassium acetate (32%) in glycol; Dabco K2097, available from Air Products Catalyst 2 N,N-dimethylcyclohexyl amine (DMCHA)
Isocyanate VORANATE™ M-220 (polymethylene polyphenylisocyanate with a total isocyanate content of about 31% and an average functionality of 2.7).

All foams are made using a high pressure Cannon machine equipped with a mix-head attached to the mold injection hole, in a laboratory where the atmospheric pressure is about 1,000 mbar (or hPa). Premix (polyol formulation plus blowing agent) and isocyanate are impinged in the mixing head at a pressure of 90 bars or higher, and injected in the mold. The mold is made of aluminum with dimensions of 194×35×6 cm and has no venting to allow the creation of an under pressure in the mold during foaming, therefore there is no extrusion of the foaming mass. The internal pressure of the mold is controlled via a pipe connected to a 500 liter buffer tank that is connected to a medium capacity vacuum pump (1500 l/min). The vacuum in the buffer tank, and thus the in mold air pressure, is maintained with control valves. The foams produced in this mold can be used to measure molded density, density distribution, compression strength, thermal conductivity and reaction-to-fire. The temperature of the mold is about 50° C. The release agent applied to the mold is ACMOS 37-7900, supplied from Acmos.

Cream Time is the time lapse in seconds from the beginning of the mixing process until a visual change of the reactants (color change and/or start of rise) occurs
Gel Time is the lapse of time in seconds from the beginning of the mixing process until a string can be pulled from the rising foam using a probe like a tongue depressor.
Free Rise Density (FRD) in kg/m$^3$ is the density measured from a 100×100×100 mm block obtained from the center of a free-rising foam (at ambient air pressure) produced from a total system formulation weight of 200 grams or more. FRD is reported in kg/m$^3$.
Minimum Filling Density (MFD) is the density determined from the minimum weight needed to fill the mold completely (packing factor=0%) and the volume of this mold. MFD is reported in kg/m$^3$.
Flow Index is the ratio of the minimum fill density/free rise density, the latter measured at atmospheric pressure.
Average density deviation is a number calculated on the base of the variation of density measured on different specimens (minimum of 17 samples) 35×10×6 cm cut from molded panel 194×35×6 cm).
Applied Density is the density determined from the injected weight in the in-mold cavity and the volume of this in-mold cavity. Applied density is reported in kg/m$^3$.
Foam compressive strength in kPa is measured perpendicular to the main faces of the molded panel, according to EN ISO 844 (2009).
Thermal Conductivity at 10° C. in mW·m° K is measured, heat-flow perpendicular to the main faces of the molded panel), according to European standard EN12667.
Flame height in cms is measured according EN ISO 11925-2.
Total heat release in MJ/m$^2$; peak of heat release in kW/m$^2$; and total smoke production in m$^2$/m$^2$ are measured using a cone calorimeter equipment according to (ISO-5660-1).

EXAMPLES

Halogen flame retardant based formulations were produced according to the components in Table 1.

TABLE 1

|  | System No. | | | |
| --- | --- | --- | --- | --- |
|  | 1 | 2 | 3 | 4 |
| Polyol 1 | 25.43 | 25.43 | 25.43 | 25.43 |
| Polyol 2 | 22.1 | 22.1 | 22.1 | 22.1 |
| Polyol 3 | | | | |
| Polyol 4 | | | | |
| Additive 1 | | | | |
| FR 1 | | | | |
| FR 2 | 8.51 | 8.51 | 8.51 | 8.51 |
| FR 3 | 33.81 | 33.81 | 33.81 | 33.81 |
| Surfactant | 4 | 4 | 4 | 4 |
| Catalyst 1 | 2.05 | 2.05 | 2.05 | 2.05 |
| Catalyst 2 | 0.25 | 0.25 | 0.25 | 0.25 |
| Formic acid | 3.4 | 3.4 | 3.4 | 3.4 |
| water | 0.45 | 0.45 | 0.45 | 0.45 |
| Total | 100 | 100 | 100 | 100 |
| Index | 400 | 300 | 400 | 300 |
| c/i-pentane* | 6 | 6 | 10 | 10 |
| Isocyanate | 216 | 162 | 216 | 162 |

*Is a 70/30 wt/wt blend of cyclo-/isopentane.

The polyol formulations/blowing agents were mixed with the isocyanate and injected into a mold at ambient pressure of about 1000 mbar to produce standard foam (Comparative Examples 1-4) and molds maintained at 900 mbar (Examples 1-4). The properties of the produced foams are shown in Table 2. Formulations 3 and 4 (comparative examples 3 and 4) utilize a higher level of hydrocarbon blowing agent to obtain densities comparable to those obtained in Examples 1 and 2.

TABLE 2

|  | System 1 | | System 2 | | System 3 | System 4 |
| --- | --- | --- | --- | --- | --- | --- |
|  | Comp Ex 1 | Ex 1 | Comp Ex 2 | Ex 2 | Comp Ex 3 | Comp Ex 4 |
| Mold pressure (bar) | 1 | 0.9 | 1 | 0.9 | 1 | 1 |
| Cream Time (s) | 7 | | 4 | | 10 | 7 |
| Gel Time (s) | 64 | | 51 | | 90 | 60 |
| Free Rise Density (kg/m$^3$) | 33.2 | | 27.5 | | 30.5 | 26.5 |
| MFD (g/l) | 46.5 | 41.05 | 39.3 | 35.05 | 41.93 | 37.8 |
| Flow Index | 1.401 | 1.236 | 1.429 | 1.275 | 1.375 | 1.426 |
| Applied Density (g/l) | 51.96 | 43.20 | 45.76 | 39.14 | 46.80 | 41.60 |
| Average Density Deviation | 1.248 | 0.811 | 0.938 | 0.568 | 0.805 | n.d. |

TABLE 2-continued

|  | System 1 | | System 2 | | System 3 | System 4 |
| --- | --- | --- | --- | --- | --- | --- |
|  | Comp Ex 1 | Ex 1 | Comp Ex 2 | Ex 2 | Comp Ex 3 | Comp Ex 4 |
| Compressive Strength (kPa) | 287 | 181 | 209 | 141 | 205 | 134 |
| EN ISO 11925-2, flame height (cm) | 6 | 5 | 8 | 6 | 11 | 12 |
| ISO 5660-1, Peak of heat release (kW/m$^2$) | 86.7 | 81.0 | 76.1 | 68.1 | 87.3 | n.d. |

Halogen-free flame retardant formulations were produced according to the components in Table 3.

TABLE 3

| | System No. | | | | | |
| --- | --- | --- | --- | --- | --- | --- |
|  | 5 | 6 | 7 | 8 | 9 | 10 |
| Polyol 1 | 48.3 | 49.2 | 49.2 | 49.2 | 23 | 23 |
| Polyol 2 | 20.6 | 20.6 | 20.6 | 20.6 | 10.6 | 10.75 |
| Polyol 3 |  |  |  |  | 35 | 35 |
| Polyol 4 |  |  |  | 7 |  |  |
| Additive 1 |  |  |  | 7 |  |  |
| FR 1 | 15 | 15 | 15 |  | 15 | 15 |
| FR 2 | 8.5 | 8.5 | 8.5 | 8.5 | 8.5 | 8.5 |
| FR 3 |  |  |  |  |  |  |
| Surfactant | 4 | 4 | 4 | 4 | 4 | 4 |
| Catalyst 1 | 1.1 | 1.1 | 0.9 | 1.2 | 1.25 | 1 |
| Catalyst 2 | 0.2 | 0.2 | 0.2 | 0.2 | 0.35 | 0.25 |
| Formic acid | 1.8 | 1.1 | 0.5 | 1.8 | 1.8 | 1.8 |
| water | 0.5 | 0.3 | 0.2 | 0.5 | 0.5 | 0.5 |
| Total | 100 | 100 | 99.1 | 100 | 100 | 99.8 |
| Index | 350 | 350 | 350 | 350 | 350 | 230 |
| c/i-pentane | 6.5 | 10 | 12.5 | 6.8 | 7.5 | 5 |
| % mols HC/tot. | 57.4 | 77.4 | 88.8 | 50.9 | 60.9 | 64.2 |
| mmoles B.A |  |  |  |  |  |  |
| Isocyanate (parts by weight) | 191 | 168 | 149 | 191 | 213 | 139 |

The polyol formulations/blowing agents were mixed with the isocyanate and injected into a mold at ambient pressure of about 1000 mbar to produce standard foam (Comparative Example 5 and Comparative Example 8) and molds maintained at 900 mbar (Examples 3-6 and Comparative Examples 10 and 12). Comparative examples 6, 7, 9, 11 are produced by pouring the reactive mixture into a bag and measuring reactivity and FRD.

TABLE 4

|  | System 5 | | System 6 | | System 7 | | System 8 | | System 9 | | System 10 | |
| --- | --- | --- | --- | --- | --- | --- | --- | --- | --- | --- | --- | --- |
|  | Comp Ex 5 | Ex 3 | Comp Ex 6 | Ex 4 | Comp Ex 7 | Ex 5 | Comp Ex 8 | Ex 6 | Comp Ex 9 | Comp Ex 10 | Comp Ex 11 | Comp Ex 12 |
| Mold pressure (absolute bar) | 1 | 0.9 | 1 | 0.9 | 1 | 0.9 | 1 | 0.9 | 1 | 0.9 | 1 | 0.9 |
| Cream Time (s) | 11 |  | 10 |  | 10 |  | 9 |  | 12 |  | 8 |  |
| Gel Time (s) | 75 |  | 60 |  | 63 |  | 74 |  | 97 |  | 78 |  |
| Free Rise Density (kg/m$^3$) | 38.55 |  | 34.82 |  | 33.8 |  | 35.2 |  | 39.06 |  | 35.3 |  |
| MFD 50° C. (g/l) | 60.3 | 54.28 | n.d. | 49.26 | n.d. | 50.47 | 55.2 | 51.15 | n.d. | 51.05 | n.d. | 50.48 |
| Flow Index 50° C. | 1.56 | 1.408 | n.d. | 1.41 | n.d. | 1.49 | 1.57 | 1.45 | n.d. | 1.31 | n.d. | 1.43 |
| Applied Density (g/l) | n.d. | 57 |  | 51.7 |  | 53 | 58.7 | 53.7 |  | 53.6 |  | 53 |
| Average Density Deviation |  | 0.655 |  | 0.62 |  | 0.63 |  | 0.56 |  | 0.63 |  | 0.63 |
| Compressive Strength (kPa) | n.d. | 228 |  | 136 |  | 129 | 174 | 196 |  | 184 |  | 172 |
| Thermal Conductivity 10° C. (mW · m ° K) |  | 22.31 |  | 22.4 |  | 21.62 |  | 21.65 |  | 22.96 |  | 23.12 |
| EN ISO 11925-2, flame height (cm) | 5.5 | 4 |  | 6.5 |  | 7.5 |  | 5 |  | 8 |  | 10 |
| ISO-5601-1, Total heat release (MJ/m$^2$) | n.d. | 15.7 |  | 14.5 |  | 16 | 17.5 | 14.3 |  | 15.6 |  | n.d. |
| ISO 5660-1, Total smoke production (m$^2$/m$^2$) | n.d. | 338 |  | 225 |  | 243 | 331 | 206 |  | 394 |  | n.d. |

TABLE 5

|  | System 5 | | | | |
| --- | --- | --- | --- | --- | --- |
|  | Ex 3 | Ex 3a | Ex 3b | Ex 3c | Ex 3d |
| Brett Mold Pressure at 50° C. (bar) | 0.9 | 0.8 | 0.8 | 0.7 | 0.7 |
| Applied Density (g/l) | 57 | 57.7 | 52 | 57.3 | 52.1 |
| Average Density Deviation | 0.655 | 0.4 | 0.43 | 0.39 | 0.5 |
| Compressive Strength (kPa) | 228 | 279.3 | 194.2 | 274.7 | 224.6 |
| Thermal Conductivity 10° C. (mW/m ° K) | 22.31 | 22.15 | 22.64 | 23.24 | 22.7 |
| Aesthetics | good | Very good | good | Very good | good |
| filling | OK | OK | OK | OK | OK |

To determine the versatility of the present process, System 5 is used to produce foams at various pressures to determine the applied density and to visually observe the aesthetic properties of the produced insulated panels. The obtained results are given in Table 5 above. Aesthetics refers to visual observation of quantity and size of the voids.

The results in Table 2 and 4 show that the foams of the present invention (Examples 1-6) meet the requirements for reaction-to-fire Euroclass E according to EN ISO 11925-2 standard (flame height of less than 15 cm) and exhibit a good reaction profile.

As can be seen from Examples 1 and 2 in Table 2, the foams of the present invention (molded at 900 mbar) show reduced flame height properties as compared to foams of the same formulation, produced under standard pressure conditions. For instance, the flame height of system 1, molded at 1000 mbar is 6 cm, whereas the flame height of system 1 molded at 900 mbar is only 5 cm.

Examples 1 and 2 also demonstrate that peak of the heat release produced by the foams molded at 900 mbar is lower than that of the foams molded at 1000 mbar.

As can be seen from Table 4, the halogen-free formulation of Example 3 and 6 molded at 900 mbar, also has significantly improved fire properties than the foam of the same formulation molded at 1000 mbar. The 10 percent reduction in mold air pressure leads, together with the reduced applied densities, to a reduction in EN ISO 11925-2 flame height, in a reduction of total heat release, and a significant reduction in the total smoke produced.

System 9 and 10 do not fall within the scope of the present invention. System 9 does not comprise a polyol mixture that is at least 35 weight percent aromatic polyester polyol. System 10 similarly does not comprise a polyol mixture that is at least 35 weight percent aromatic polyester polyol and also does not have an isocyanate index of greater than 250

As can be seen from Table 4, the systems of the present invention (i.e., examples 3-6 comprising a polyol mixture made up of at least 35 weight percent aromatic polyester polyol and having an isocyanate index of greater than 250), result in foams having improved fire properties over the foams of systems 9 and 10, when molded at 900 mbar. For example, the flame height of system 10, molded at 900 mbar is 10 cm, whereas the flame height of examples 3-6, molded at 900 mbar are all less or equal than 7.5 cm. In addition the total smoke produced by system 9, molded at 900 mbar, is significantly greater that the total smoke produced by any of examples 3-6 when molded at 900 mbar.

As can be seen from Table 4 and 5 the method of the invention allows the production of PIR foams characterized by excellent thermal insulation. Moreover, as shown in Table 5 the method allows to easily control the cavity filling and the material distribution (density deviation), by adjusting the absolute pressure in the mold cavity.

Whilst the invention has been described with reference to a preferred embodiment, it will be appreciated that various modifications are possible within the scope of the invention.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

The invention claimed is:

1. A method of making a polyisocyanurate (PIR) foam, comprising:
   A) injecting into a closed mold cavity, wherein said mold cavity is under an absolute pressure of from 300 to 950 mbar, a reaction mixture comprising:
      a) an organic polyisocyanate;
      b) a polyol mixture, wherein the polyol mixture comprises an aromatic polyester polyol, wherein the aromatic polyester polyol is at least 35 weight percent of the total amount of polyol;
      c) a trimerisation catalyst;
      d) at least one flame retardant;
      e) optionally auxiliary substances; and
      f) a blowing agent component,
   wherein said reaction mixture has an isocyanate index of greater than 250 and a gel time of at least 50 seconds; and
   B) curing to form a polyisocyanurate foam.

2. The method according to claim 1, wherein said closed mold cavity is defined by two exterior shells and an annular frame.

3. The method according to claim 1, wherein the aromatic polyester polyol is at least 50 weight percent of the total amount of polyol.

4. The method according to claim 1, wherein the reaction mixture has an isocyanate index of greater than 350.

5. The method according to claim 1, wherein the mold cavity absolute pressure is from 800 to 950 mbar.

6. The method according to claim 1, wherein the blowing agent component comprises a physical and chemical blowing agent.

7. The method according to claim 6, wherein the chemical blowing agent is water, formic acid or a combination thereof.

8. The method according to claim 6, wherein the physical blowing agent is pentane.

9. The method according to claim 1, wherein the foam has an applied density of 30 to 75 kg/m3.

10. The method according to claim 1, wherein the reaction mixture additionally comprises a silicone surfactant.

11. The method according to claim 1, wherein the flame retardant is a halogen free flame retardant.

12. The method according to claim 1, wherein the aromatic polyester polyol is at least 50 weight percent and less than 80 weight percent of the total amount of polyol.

13. The method according to claim 12, wherein the aromatic polyester polyol is derived from phthalic anhydride, phthalic acid, isophthalic acid, terephthalic acid, methyl esters of phthalic, isophthalic acid, terephthalic acid, dimethyl terephthalate, trimellitic anhydride, pyromellitic dianhydride, or mixtures thereof.

14. The method according to claim 1, wherein the aromatic polyester polyol is derived from phthalic anhydride, phthalic acid, isophthalic acid, terephthalic acid, methyl esters of phthalic, isophthalic acid, terephthalic acid, dimethyl terephthalate, trimellitic anhydride, pyromellitic dianhydride, or mixtures thereof.

15. The method according to claim 1, wherein the polyol mixture further includes from 10 to 60 weight percent of a novolac initiated polyether polyol, of the total amount of polyol.

\* \* \* \* \*